United States Patent
Liu et al.

(10) Patent No.: US 8,086,114 B2
(45) Date of Patent: Dec. 27, 2011

(54) FILTER COEFFICIENT CHANGING APPARATUS AND METHOD

(75) Inventors: Ling Liu, Beijing (CN); Zhenning Tao, Beijing (CN); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 462 days.

(21) Appl. No.: 12/320,793

(22) Filed: Feb. 4, 2009

(65) Prior Publication Data

US 2009/0245816 A1 Oct. 1, 2009

(30) Foreign Application Priority Data

Apr. 1, 2008 (CN) .......................... 2008 1 0090222

(51) Int. Cl.
*H04B 10/06* (2006.01)

(52) U.S. Cl. .................... 398/208; 398/205; 398/211

(58) Field of Classification Search ............... 398/202, 398/204, 205, 208, 211
See application file for complete search history.

(56) References Cited

U.S. PATENT DOCUMENTS

| | | | | |
|---|---|---|---|---|
| 7,636,525 | B1* | 12/2009 | Bontu et al. | 398/208 |
| 2007/0092259 | A1* | 4/2007 | Bontu et al. | 398/147 |
| 2007/0092260 | A1* | 4/2007 | Bontu et al. | 398/152 |
| 2008/0025728 | A1* | 1/2008 | Shpantzer et al. | 398/104 |
| 2008/0152361 | A1* | 6/2008 | Chen et al. | 398/205 |

* cited by examiner

*Primary Examiner* — Nathan Curs
(74) *Attorney, Agent, or Firm* — Staas & Halsey LLP

(57) ABSTRACT

The present invention discloses filter coefficient changing apparatus and method for use in a dual-polarized optical coherent receiver. The apparatus comprises a controlling unit, a switching unit and a new coefficient obtaining unit. The switching unit is connected between a first filter coefficient updating unit and a first filtering unit and a second filtering unit; the new coefficient obtaining unit generates new filter coefficients for the first filtering unit and the second filtering unit in accordance with filter coefficients outputted by a second filter coefficient updating unit; and the controlling unit generates a control signal that controls switching of the switching unit. Upon reception of the control signal, the switching unit breaks off output of the filter coefficients from the first filter coefficient updating unit, transmits new filter coefficients from the new coefficient obtaining unit to the first filtering unit and the second filtering unit, and subsequently resumes the output of the filter coefficients from the first filter coefficient updating unit to the first filtering unit and the second filtering unit.

10 Claims, 4 Drawing Sheets

FILTER COEFFICIENT CHANGING APPARATUS AND METHOD

FIELD OF THE INVENTION

The present invention relates to optical communications, and more particularly, to a dual-polarized optical coherent receiver (also referred to as dual-polarized coherent receiver).

BACKGROUND OF THE RELATED ART

By utilizing two quadrature polarization states (x and y) of light, dual-polarized system can simultaneously transmit two independent signals (h and v, which are also referred to as first information source and second information source) within the same bandwidth, to thereby enhance transmission efficiency of the channel by two times. But there may be many linear transmission distortions generated in the optical fiber channel due, for instance, to chromatic dispersion (CD), polarization-mode dispersion (PMD), polarization dependent loss (PDL) and limitations of optical/electrical filter bandwidth. Besides, the optical fiber channel changes the polarization state of the input signal, and thus leading to crosstalk between two branches of signals, that is to say, the polarization state x simultaneously contains the information of h and v, while the polarization state y also simultaneously contains the information of h and v. The polarization diversity coherent receiver simultaneously recovers the signals (including the cophase component and the quadrature component) of the x and y polarization states. The linearity of the channel remains, so electrical equalization is suitable to de-multiplex and compensate various distortions in the channel. Because the change of the polarization states by the channel and other distortions (such as those caused by PMD) are time varying, electrical equalization of the receiver must be a dynamic compensation system that tracks the change in real time. However, the method of blind equalization is usually employed in the optical communication system due to the lack of a training signal. Such an example is provided in documents OFC07 paper OTuA1 "Transmission of 42.8 Gbit/s Polarization Multiplexed NRZ-QPSK over 6400 km of Standard Fiber with no Optical Dispersion Compensation".

FIG. 1 is a block diagram showing a dual-polarized coherent receiver of the prior art. As shown in FIG. 1, the input optical signal 101 of the dual-polarized optical coherent receiver comprises two polarization components. The input optical signal 101 is separated by means of a polarization beam splitter 103 into two components of the x direction and the y direction to be respectively connected to the first input port of an x-branch 90° optical mixer 105 and the first input port of a y-branch 90° optical mixer 106. A receiving end local oscillator 102 (local laser) is connected to a 50:50 coupler 104, and its output is respectively outputted to the second input port of the x-branch 90° optical mixer 105 and the second input port of the y-branch 90° optical mixer 106. Two outputs of the x-branch 90° optical mixer 105 are respectively outputted to twin photoelectric detectors 107 and 108, and two outputs of the y-branch 90° optical mixer 106 are respectively outputted to twin photoelectric detectors 109 and 110. Outputs of the twin photoelectric detectors 107, 108, 109 and 110 are respectively connected to analog-to-digital converters 111, 112, 113 and 114. These constitute the front-end processing section of the dual-polarized coherent receiver. The front-end processing section of the dual-polarized coherent receiver separates and converts the optical signal 101 into baseband digital signals of two directions, ie. Ix+jQx 115 (also referred to as the first component signal) and Iy+jQy 116 (also referred to as the second component signal), where Ix is the cophase component in the x direction, Qx is the quadrature component in the x direction, Iy is the cophase component in the y direction, and Qy is the quadrature component in the y direction.

As should be noted, the above illustration to the front-end processing section of the dual-polarized coherent receiver is only exemplary in nature. It can also be implemented by self-coherent detecting devices, field identification processing devices or other front-end processing sections of other structures well known to persons skilled in the art, and these all fall within the scope of the front-end processing section according to the present invention.

The baseband digital signals of two directions Ix+jQx 115 and Iy+jQy 116 are connected to the downstream digital signal processing unit 141 for completion of data recover. The equalizer of the digital signal processing unit of the dual-polarized coherent receiver is of a disc-shaped structure. The x-branch baseband digital signal Ix+jQx 115 is inputted to filters Hxx 117 and Hxy 119.

The filter Hxx 117 filters the baseband digital signal 115 to obtain a first information source component of the dual-polarized system.

The filter Hxy 119 filters the baseband digital signal 115 to obtain a second information source component of the dual-polarized system.

The y-branch baseband digital signal Iy+jQy 116 is inputted to filters Hyx 118 and Hyy 120.

The filter Hyx 118 filters the baseband digital signal 116 to obtain another component of the first information source of the dual-polarized system.

The filter Hyy 120 filters the baseband digital signal 116 to obtain another component of the second information source of the dual-polarized system.

Outputs of the filters Hxx 117 and Hyx 118 are inputted to an x-branch adder 121, and an x-branch equalized signal 131 outputted from the adder 121 is inputted to an x-branch phase recovering unit 123 to obtain a signal 133 whose phase has been recovered. The signal 133 is inputted to an x-branch data recovering unit 125 to obtain a recovered x-branch codebook 135. Outputs of the filters Hxy 119 and Hyy 120 are inputted to a y-branch adder 122, and a y-branch equalized signal 132 outputted from the adder 122 is inputted to a y-branch phase recovering unit 124 to obtain a signal 134 whose phase has been recovered. The signal 134 is inputted to a y-branch data recovering unit 126 to obtain a recovered y-branch codebook 136.

To facilitate description, the circuit formed by the filter 117, the filter 118, the adder 121, the phase recovering unit 123, the data recovering unit 125 as well as a blind error estimating unit 127 and a filter coefficient updating unit 129 to be discussed later is called the first branch, and the circuit formed by the filter 119, the filter 120, the adder 122, the phase recovering unit 124, the data recovering unit 126 as well as a blind error estimating unit 128 and a filter coefficient updating unit 130 to be discussed later is called the second branch.

The x-branch equalized signal 131 is further inputted to the x-branch blind error estimating unit 127, so as to estimate the equalization error. The x-branch baseband digital signal Ix+jQx 115, the y-branch baseband digital signal Iy+jQy 116, the x-branch equalized signal 131, and a blind equalization error estimating signal outputted from the x-branch blind error estimating unit 127 are inputted together to the x-branch filter coefficient updating unit 129 to obtain updated filter Hxx coefficient 137 and filter Hyx coefficient 138. The updated filter Hxx coefficient 137 and filter Hyx coefficient 138 are respectively inputted to the filter Hxx 117 and the filter Hyx 118 for update of coefficients and completion of tracking the system change.

Similarly, the y-branch equalized signal 132 is further inputted to the y-branch blind error estimating unit 128, so as to estimate the equalization error. The x-branch baseband digital signal Ix+jQx 115, the y-branch baseband digital signal Iy+jQy 116, the y-branch equalized signal 132, and a blind equalization error estimating signal outputted from the y-branch blind error estimating unit 128 are inputted together to the y-branch filter coefficient updating unit 130 to obtain updated filter Hxy coefficient 139 and filter Hyy coefficient 140. The updated filter Hxy coefficient 139 and filter Hyy coefficient 140 are respectively inputted to the filter Hxy 119 and the filter Hyy 120 for update of coefficients and completion of tracking the system change. In understandable circumstances, the filter Hxx coefficient 137, the filter Hyx coefficient 138, the filter Hxy coefficient 139 and the filter Hyy coefficient 140 are collectively referred to in the present invention as filter coefficients.

As can be seen from the structure mentioned above, the x-branch and the y-branch are identical in structure, and data processing of each is independent of the other. It is easy, in the case of blind equalization, to lead to the degraded status whereby the x-branch and the y-branch converge to the same information source. Addressing this problem, US Patent Publication US2005/0196176A1 proposed by Han Sun et al provides an algorithm for blind equalization of a dual-polarized coherent receiver to prevent two branches of signals from converging to the same information source. The method undergoes three operation modes: 1) blind self-recover procedure, to obtain a branch of converged channel; 2) training mode, to utilize a synchronous training sequence so that two branches converge to different information sources; and 3) blind equalization mode fed back from decision. This method employs the synchronous training sequence to separate the two branches. Although it is possible to provide the training sequence in the initializing process at the beginning, there is nonetheless no available synchronous training sequence during normal operation status of the system. At the same time, it is risky for error diffusion when the method runs in the decision feedback mode.

SUMMARY OF THE INVENTION

In view of the foregoing circumstances, the present invention proposes an adaptive blind equalization apparatus and an adaptive blind equalization method for optical dual-polarized coherent reception. The apparatus and method can achieve adaptive equalization of the system without the need of any training sequence, while preventing the first branch signal and the second branch signal from converging to the same information source.

In order to achieve the above objectives, the present application provides the following inventions:

Invention 1. A filter coefficient changing apparatus for use in a dual-polarized optical coherent receiver, wherein the dual-polarized optical coherent receiver comprises a front-end processing section and a data recovering unit; the front-end processing section performing front-end processing on an input signal including a first information source h and a second information source v, and outputting a first component signal and a second component signal; the data recovering unit recovering data and including a first receiving branch and a second receiving branch;

the first receiving branch including:
a first filtering unit, for filtering the first component signal to obtain a relevant component of the first information source;
a second filtering unit, for filtering the second component signal to obtain another relevant component of the first information source; and
a first filter coefficient updating unit, for updating a filter coefficient of the first filtering unit and a filter coefficient of the second filtering unit;
the second receiving branch including:
a third filtering unit, for filtering the first component signal to obtain a relevant component of the second information source;
a fourth filtering unit, for filtering the second component signal to obtain another relevant component of the second information source; and
a second filter coefficient updating unit, for updating a filter coefficient of the third filtering unit and a filter coefficient of the fourth filtering unit;
wherein the filter coefficient changing apparatus comprises a controlling unit, a switching unit and a new coefficient obtaining unit,
wherein the switching unit is connected between the first filter coefficient updating unit and the first filtering unit and the second filtering unit, for transmitting the filter coefficients outputted by the first filter coefficient updating unit to the first filtering unit and the second filtering unit; or connected between the second filter coefficient updating unit and the third filtering unit and the fourth filtering unit, for transmitting the filter coefficients outputted by the second filter coefficient updating unit to the third filtering unit and the fourth filtering unit;
wherein, in the case the switching unit is connected between the first filter coefficient updating unit and the first filtering unit and the second filtering unit, the new coefficient obtaining unit generates new filter coefficients for the first filtering unit and the second filtering unit in accordance with the filter coefficients outputted by the second filter coefficient updating unit; and in the case the switching unit is connected between the second filter coefficient updating unit and the third filtering unit and the fourth filtering unit, the new coefficient obtaining unit generates new filter coefficients for the third filtering unit and the fourth filtering unit in accordance with the filter coefficients outputted by the first filter coefficient updating unit;
wherein the controlling unit generates a control signal that controls switching of the switching unit;
and wherein the switching unit, in the case of its being used for transmitting the filter coefficients outputted by the first filter coefficient updating unit to the first filtering unit and the second filtering unit, upon reception of the control signal from the controlling unit, breaks off the output of the filter coefficients from the first filter coefficient updating unit to the first filtering unit and the second filtering unit, transmits the new filter coefficients from the new coefficient obtaining unit to the first filtering unit and the second filtering unit, and subsequently resumes the output of the filter coefficients from the first filter coefficient updating unit to the first filtering unit and the second filtering unit; and in the case of its being used for transmitting the filter coefficients outputted by the second filter coefficient updating unit to the third filtering unit and the fourth filtering unit, upon reception of the control signal from the controlling unit, breaks off the output of the filter coefficients from the second filter coefficient updating unit to the third filtering unit and the fourth filtering unit, transmits the new filter coefficients from the new coefficient obtaining unit to the third filtering unit and the fourth filtering unit, and subsequently resumes the output of the filter coefficients from the second filter coefficient updating unit to the third filtering unit and the fourth filtering unit.

Invention 2. The filter coefficient changing apparatus for use in a dual-polarized optical coherent receiver according to Invention 1, characterized in that the controlling unit counts the number of coefficient updates of the first filter coefficient updating unit or the number of coefficient updates of the second filter coefficient updating unit, and generates the control signal when the counted number is greater than a predetermined threshold.

Invention 3. The filter coefficient changing apparatus for use in a dual-polarized optical coherent receiver according to Invention 1, characterized in that the controlling unit generates the control signal in accordance with a control instruction inputted from external to the controlling unit.

Invention 4. The filter coefficient changing apparatus for use in a dual-polarized optical coherent receiver according to Invention 1, characterized in that the controlling unit generates the control signal in accordance with the filter coefficient of the first filtering unit, the filter coefficient of the second filtering unit, the filter coefficient of the third filtering unit and the filter coefficient of the fourth filtering unit, and by judging whether the signal of the first receiving branch and the signal of the second receiving branch converge to the same information source.

Invention 5. The filter coefficient changing apparatus for use in a dual-polarized optical coherent receiver according to Invention 1, characterized in that the first receiving branch further includes a first summating unit, and that the second receiving branch further includes a second summating unit, of which the first summating unit summates the output of the first filtering unit and the output of the second filtering unit, and the second summating unit summates the output of the third filtering unit and the output of the fourth filtering unit, wherein the controlling unit generates the control signal in accordance with the summation result of the first summating unit and the summation result of the second summating unit, and by judging whether the signal of the first receiving branch and the signal of the second receiving branch converge to the same information source.

Invention 6. The filter coefficient changing apparatus for use in a dual-polarized optical coherent receiver according to Invention 1, characterized in that the first receiving branch further includes the first summating unit and a first phase recovering unit, and that the second receiving branch further includes the second summating unit and a second phase recovering unit, of which the first summating unit summates the output of the first filtering unit and the output of the second filtering unit, the second summating unit summates the output of the third filtering unit and the output of the fourth filtering unit, the first phase recovering unit recovers a phase of the signal from the first summating unit, and the second phase recovering unit recovers a phase of the signal from the second summating unit, wherein the controlling unit generates the control signal in accordance with the signal outputted by the first phase recovering unit and the signal outputted by the second phase recovering unit, and by judging whether the signal of the first receiving branch and the signal of the second receiving branch converge to the same information source.

Invention 7. The filter coefficient changing apparatus for use in a dual-polarized optical coherent receiver according to Invention 1, characterized in that the first receiving branch further includes the first summating unit, the first phase recovering unit and a first data recovering unit, and that the second receiving branch further includes the second summating unit, the second phase recovering unit and a second data recovering unit, of which the first summating unit summates the output of the first filtering unit and the output of the second filtering unit, the second summating unit summates the output of the third filtering unit and the output of the fourth filtering unit, the first phase recovering unit recovers a phase of the signal from the first summating unit, the second phase recovering unit recovers a phase of the signal from the second summating unit, the first data recovering unit recovers data in the signal from the first phase recovering unit, and the second data recovering unit recovers data in the signal from the second phase recovering unit, wherein the controlling unit generates the control signal in accordance with the signal outputted by the first data recovering unit and the signal outputted by the second data recovering unit, and by judging whether the signal of the first receiving branch and the signal of the second receiving branch converge to the same information source.

Invention 8. The filter coefficient changing apparatus for use in a dual-polarized optical coherent receiver according to Invention 1, characterized in that the filter coefficient changing apparatus further comprises an on-off changing unit connected to the new coefficient obtaining unit, wherein, when the controlling unit sends the control signal, the on-off changing unit is turned on, so that the new coefficient obtaining unit is capable of receiving the signal from the first filter coefficient updating unit or the second filter coefficient updating unit, and the on-off changing unit is subsequently turned off, so that the new coefficient obtaining unit is incapable of receiving the signal from the first filter coefficient updating unit or the second filter coefficient updating unit.

Invention 9. The filter coefficient changing apparatus for use in a dual-polarized optical coherent receiver according to Invention 1, characterized in that the new coefficient obtaining unit includes an overturn center estimating unit, a symmetrically overturning unit and a complex conjugate substituting unit, of which the overturn center estimating unit, the symmetrically overturning unit and the complex conjugate substituting unit operate in accordance with one of the following modes:

Mode 1 the overturn center estimating unit determines the overturn center in accordance with an inputted filter coefficient;

the symmetrically overturning unit symmetrically overturns the inputted filter coefficient in accordance with the overturn center determined by the overturn center estimating unit;

the complex conjugate substituting unit performs complex conjugate substitution on the symmetrically overturned filter coefficient;

Mode 2 the overturn center estimating unit determines the overturn center in accordance with an inputted filter coefficient;

the complex conjugate substituting unit performs complex conjugate substitution on the inputted filter coefficient;

the symmetrically overturning unit symmetrically overturns, in accordance with the overturn center determined by the overturn center estimating unit, the filter coefficient on which the complex conjugate substitution has been performed;

Mode 3 the complex conjugate substituting unit performs complex conjugate substitution on an inputted filter coefficient;

the overturn center estimating unit determines the overturn center in accordance with the filter coefficient on which the complex conjugate substitution has been performed;

the symmetrically overturning unit symmetrically overturns, in accordance with the overturn center determined by the overturn center estimating unit, the filter coefficient on which the complex conjugate substitution has been performed.

Invention 10. The filter coefficient changing apparatus for use in a dual-polarized optical coherent receiver according to Invention 9, characterized in that the overturn center estimating unit determines an integer greater than 1 and less than filter dimensionality as the overturn center, or determines a positional center of the filter as the overturn center, or determines the overturn center in accordance with an inputted power center of the filter coefficient.

Invention 11. A dual-polarized optical coherent receiver, comprising a front-end processing section and an equalizer unit, the front-end processing section performing front-end processing on an input signal including a first information source h and a second information source v, and outputting a first component signal and a second component signal, and the equalizer unit performing data recover; characterized in that the dual-polarized optical coherent receiver further comprises the filter coefficient changing apparatus according to any one of Inventions 1-10.

Invention 12. A filter coefficient changing method for use in a dual-polarized optical coherent receiver, wherein the dual-polarized optical coherent receiver comprises a front-end processing section and an data recovering unit; the front-end processing section performing front-end processing on an input signal including a first information source h and a second information source v, and outputting a first component signal and a second component signal; the data recovering unit recovering data and including a first receiving branch and a second receiving branch; the first receiving branch including:

a first filtering unit, for filtering the first component signal to obtain a relevant component of the first information source;

a second filtering unit, for filtering the second component signal to obtain another relevant component of the first information source; and a first filter coefficient updating unit, for updating a filter coefficient of the first filtering unit and a filter coefficient of the second filtering unit;

the second receiving branch including:

a third filtering unit, for filtering the first component signal to obtain a relevant component of the second information source;

a fourth filtering unit, for filtering the second component signal to obtain another relevant component of the second information source; and a second filter coefficient updating unit, for updating a filter coefficient of the third filtering unit and a filter coefficient of the fourth filtering unit;

wherein the filter coefficient changing method comprises:

a new coefficient obtaining step, for generating new filter coefficients for the first filtering unit and the second filtering unit in accordance with the filter coefficients outputted by the second filter coefficient updating unit, or generating new filter coefficients for the third filtering unit and the fourth filtering unit in accordance with the filter coefficients outputted by the first filter coefficient updating unit;

a control signal generating step, for generating a switching control signal; and a switching step, in the case the new coefficient obtaining step generating new filter coefficients for the first filtering unit and the second filtering unit in accordance with the filter coefficients outputted by the second filter coefficient updating unit, upon generation of the switching control signal in the control signal generating step, for inputting the new filter coefficients obtained in the new coefficient obtaining step into the first filtering unit and the second filtering unit to replace the filter coefficients outputted by the first filter coefficient updating unit, and subsequently inputting again the filter coefficients outputted by the first filter coefficient updating unit into the first filtering unit and the second filtering unit to replace the new filter coefficients obtained in the new coefficient obtaining step; and, in the case the new coefficient obtaining step generating new filter coefficients for the third filtering unit and the fourth filtering unit in accordance with the filter coefficients outputted by the first filter coefficient updating unit, upon generation of the switching control signal in the control signal generating step, for inputting the new filter coefficients obtained in the new coefficient obtaining step into the third filtering unit and the fourth filtering unit to replace the filter coefficients outputted by the second filter coefficient updating unit, and subsequently inputting again the filter coefficients outputted by the second filter coefficient updating unit into the third filtering unit and the fourth filtering unit to replace the new filter coefficients obtained in the new coefficient obtaining step.

Moreover, the aforementioned apparatus and method can also be implemented by means of a CPU of a computing device (such as a personal computer) and on the basis of operations by softwares that achieve the functions of each of the aforementioned component parts. Accordingly, computer softwares enabling the computing device to implement the aforementioned apparatus, units and method also fall within the protection scope of the present invention.

Furthermore, computer readable media storing the computer programs also fall within the protection scope of the present invention. The computer readable media can for instance be such computer readable storage media as a floppy disk, a magnetic disk, a CD, a DVD, Flash or MO that are known in the art to store by whichever means of light, electricity and magnetism, etc.

DRAWINGS ACCOMPANYING THE DESCRIPTION

Upon review of the detailed description of the specific embodiments of the present invention with reference to the accompanying drawings, the above and other characteristics, advantages and objectives of the present invention will become apparent to persons skilled in the art. In the drawings.

SPECIFIC EMBODIMENTS

Specific embodiments of the present invention are described in greater detail below with reference to the accompanying drawings.

Figure 2:
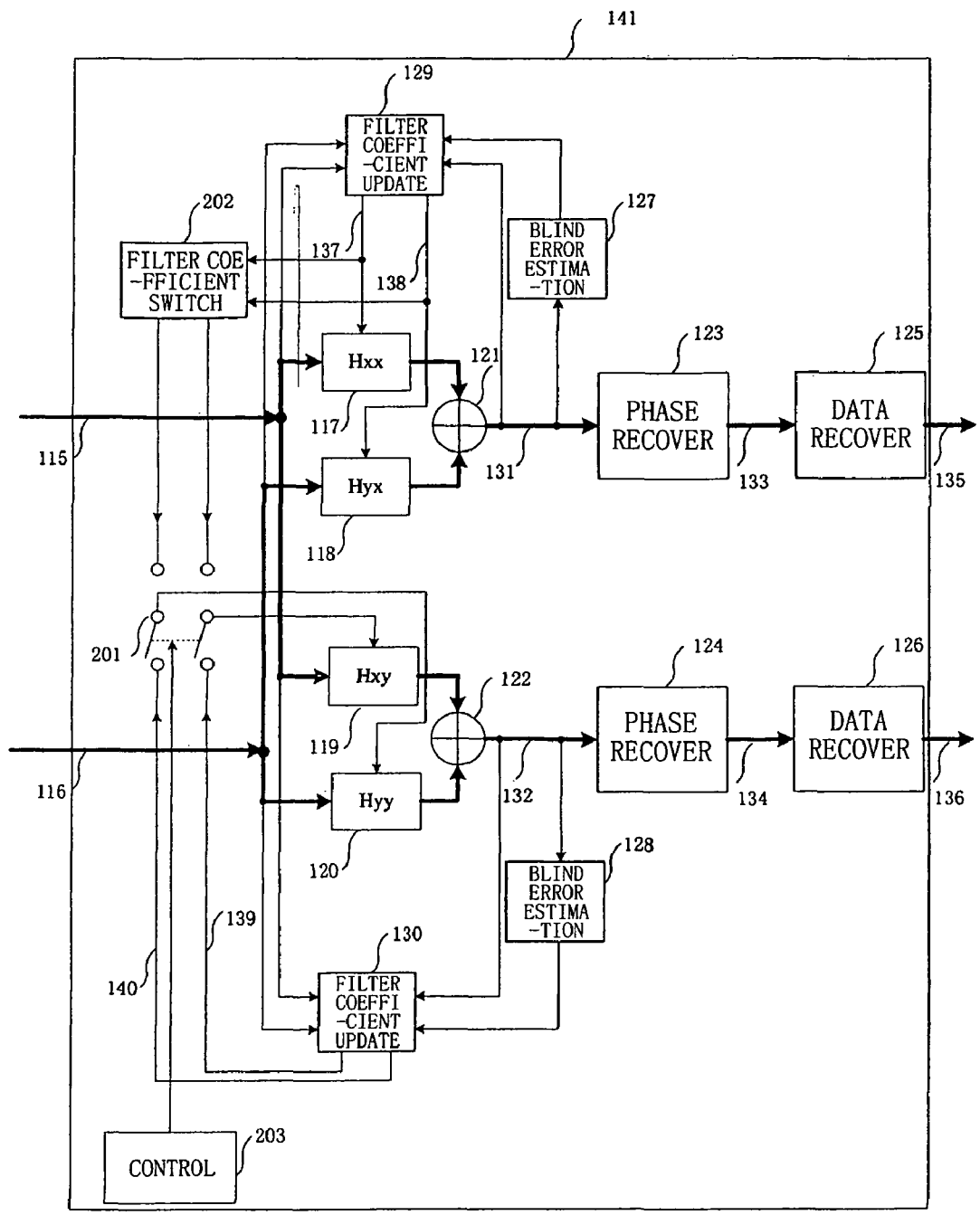
FIG. 2 is a block diagram showing the blind equalization device of the dual-polarized coherent receiver according to one embodiment of the present invention.

FIG. 2 is a block diagram showing the blind equalization device 241 of the optical dual-polarized coherent receiver according to one embodiment of the present invention. The structure as shown differs from the blind equalization device of the prior art dual-polarized coherent receiver in the addition of a controlling unit 203, a control switch 201, and a filter coefficient exchanging unit 202. These units are described in detail below.

The filter coefficient exchanging unit 202 changes the filter coefficient generated by the filter coefficient updating unit 129, and, on the basis of the filter coefficient generated by the x-branch filter coefficient updating unit 129 and the filter coefficient obtained by the filter coefficient switching unit 202, the x-branch codebook 135 and the y-branch codebook 136 as generated by the equalizer 241 do not converge to the same information source.

Figure 1:
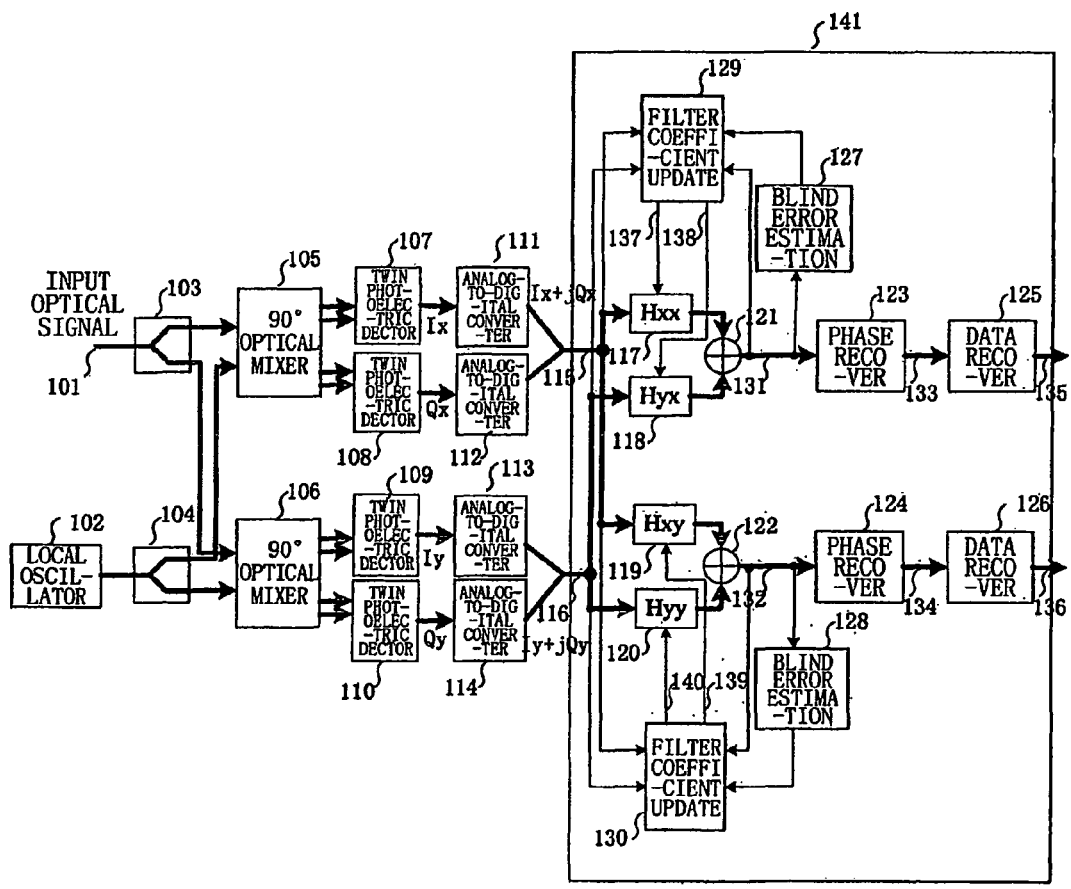
FIG. 1 is a block diagram showing the prior art dual-polarized coherent receiver.

Under certain circumstances (such as when a predetermined condition is met, or a predetermined command is received), the controlling unit 203 outputs a control signal to control the direction of the switch 201. In usual circumstance the switch 201 switches towards the lower portion of FIG. 2, and is connected to outputs 139 and 140 of the y-branch filter coefficient updating unit 130; this is identical with the circumstance as shown in FIG. 1. Upon reception of the control signal outputted from the controlling unit 203, the switch 201 switches towards the upper portion of FIG. 2, and is connected to the output of the filter coefficient switching unit 202, switches again towards the lower portion after updating the filters Hxy 119 and Hyy 120 once, and is connected to the filter coefficients 139 and 140 outputted from the y-branch filter coefficient updating unit 130.

Additionally, although not shown, it is possible for signals 137 and 138 to pass through a switch before being inputted to the filter coefficient exchanging unit 202, and this switch is also controlled by the controlling unit 203 and switches in synchrony with the control switch 201 to turn on or off. It is thus possible to reduce operation time of the filter coefficient exchanging unit 202 and lower power consumption.

The filter coefficient exchanging unit 202 is described in detail below. Inputs to the filter coefficient exchanging unit 202 are outputs 137 and 138 of the x-branch filter coefficient updating unit 129, namely coefficients Hxx(1), Hxx(2), ... Hxx(N) of Hxx, and Hyx(1), Hyx(2), ... Hyx(N) of Hyx, where N is filter dimensionality.

Figure 3:
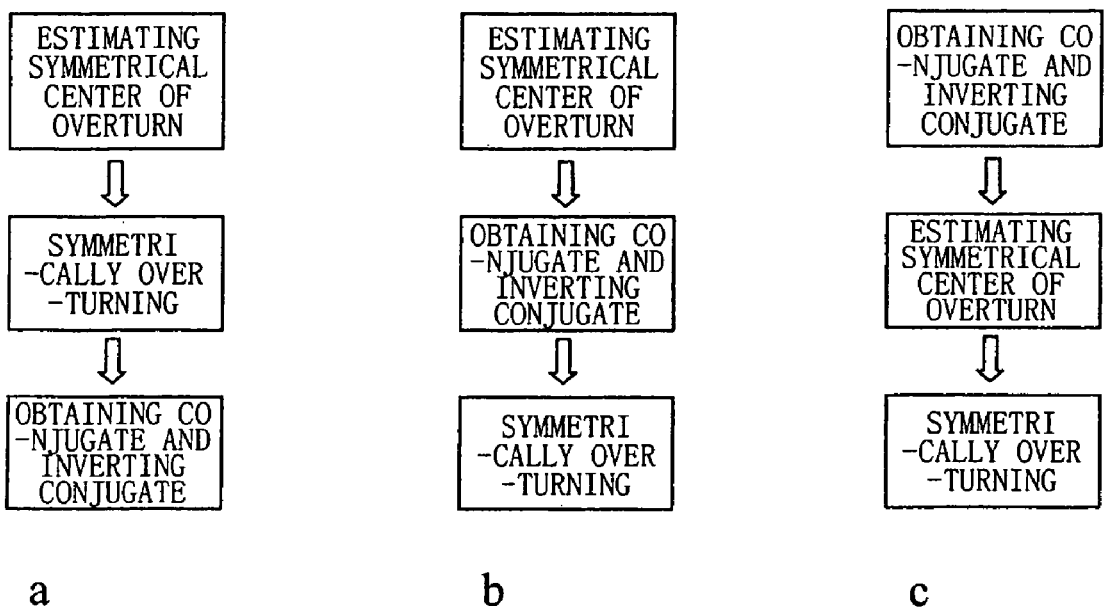
FIG. 3 is an operational flowchart illustrating an embodiment of the filter coefficient exchanging device as shown in FIG. 2.

As shown in (a) of FIG. 3, processing of the filter coefficient exchanging unit 202 may include the following three steps according to one embodiment of the present invention:

1) Estimating Symmetrical Center of Overturn

For instance, the symmetrical center can be simply selected as a certain value from among 1~N (where N is precisely the previously mentioned N indicating filter dimensionality). The positional center $\lceil (N+1)/2 \rceil$ of the filter coefficient can also be selected as the symmetrical center. Preferably, an average value of power centers of two branches of filters can also be selected as the symmetrical center.

Selection of the symmetrical center is described below with the power center as an example.

Firstly, power center Ixx of the filter Hxx and power center Iyx of the filter Hyx are calculated in accordance with the following Equations:

$$Ixx = \frac{\sum_{n=1}^{N} n \times |Hxx(n)|^2}{\sum_{n=1}^{N} |Hxx(n)|^2}$$

$$Iyx = \frac{\sum_{n=1}^{N} n \times |Hyx(n)|^2}{\sum_{n=1}^{N} |Hyx(n)|^2}$$

Subsequently, the average value Ix of Ixx and Iyx is calculated in accordance with the following Equation:

$$Ix = \frac{\text{round}(Ixx + Iyx)}{2}$$

where, round function is a rounding function to round up its parameter, for instance. Ix is the power center of the two branches of filters.

2) Symmetrically Overturning

After calculation of Ix, the coefficients Hxx and Hyx are overturned, with $Ix$ as the symmetrical center, in accordance with the following Equations to obtain overturned filter coefficients T1 and T2.

$$T1(i) = Hxx(2 \times Ix - i)$$

$$T2(i) = Hyx(2 \times Ix - i), i = 1 \ldots n,$$

Redundant coefficients are directly discarded, while insufficient coefficients are zero filled.

3) Complex Conjugate Substituting

Complex conjugate substitution is then performed, whereby the Hxy coefficient can be set as inverting T2 complex conjugate, and the Hyy coefficient as T1 complex conjugate. It is also possible to set the Hxy coefficient as T2 complex conjugate, and the Hyy coefficient as inverting T1 complex conjugate.

$$Hxy(n) = -T2(n)^*,$$

$$Hyy(n) = T1(n)^*$$

where * represents complex conjugate.

Such a process of obtaining complex conjugate of the filter coefficient (or filter coefficients such as T2, T1 derived from the filter coefficient of one filter) of one filter and obtaining inverted complex conjugate of the filter coefficient (or filter coefficients such as T1, T2 derived from the filter coefficient of another filter) of another filter is referred to in this paper as complex conjugate substitution.

Although the above description is made in the order of the steps as shown in (a) of FIG. 3, the three steps can be adjusted, as shown in FIG. 3, as long as it is guaranteed that step 1) precedes step 2), while step 3) can be performed in whichever order.

Specifically, as shown in (b) of FIG. 3, processing of the filter coefficient exchanging unit 202 may include the following three steps according to one embodiment of the present invention:

(1) Estimating Overturn Center Ix
This step is the same as previously mentioned, so that no detailed description thereto is made here.
(2) Complex Conjugate Substituting $$T1(n)=-Hyx(n)*$$

$$T2(n)=Hxx(n)*$$

(3) Symmetrically Overturning $$Hxy(n)=T1(2\times Ix-n)$$

$$Hyy(n)=T2(2\times Ix-n), n=1\ldots N$$

Additionally, as shown in (c) of FIG. 3, processing of the filter coefficient exchanging unit 202 may include the following three steps according to one embodiment of the present invention:
1) Complex Conjugate Substituting $$T1(n)=-Hyx(n)*$$

$$T2(n)=Hxx(n)*$$

2) Estimating Symmetrical Center of Overturn
3) Symmetrically Overturning $$Hxy(n)=T1(2\times Ix-n)$$

$$Hyy(n)=T2(2\times Ix-n), n=1\ldots N$$

As should be noted, the above description is only exemplary of, rather than limiting the present invention. The filter coefficient exchanging device according to the present invention can also be implemented in other methods known in the art, as long as it is guaranteed that the x-branch codebook 135 and the y-branch codebook 136 do not converge to the same information source.

The controlling unit 203 is described in detail below with reference to FIGS. 4-9.

Figure 4:
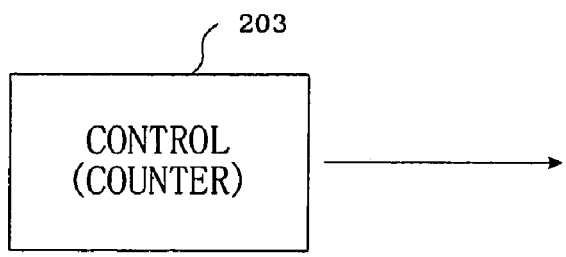
FIG. 4 through FIG. 9 exemplarily illustrate the operation modes of the controlling unit as shown in FIG. 2.

As shown in FIG. 4, the controlling unit 203 can include a counter unit in one embodiment. On system start, the controlling unit 203 records the number of updates of the system (namely the operation number of the x-branch filter coefficient updating unit 129 or the operation number of the y-branch filter coefficient updating unit 130); when the number of updates of the system reaches a predetermined number, the controlling unit 203 outputs a control pulse (control signal) to set the switch 201 as upwards and then as downwards. This is equivalent to forcing coefficient switch during the procedure of system start regardless of whether the two branches converge to the same information source.

The flow of system start under this circumstance is as follows: after charging, the x branch and the y branch operate independently; after the system is updated for the predetermined number of times, the procedure of coefficient exchanging is started; after exchanging, the x branch and the y branch continue to operate independently. It is possible to switch for only once.

As should be noted, it is described above only of using the method of counter to start coefficient switch, but actual operation is not restricted thereto, as it suffices to start the coefficient exchanging procedure insofar as satisfying the predetermined number of system updates.

Figure 5:
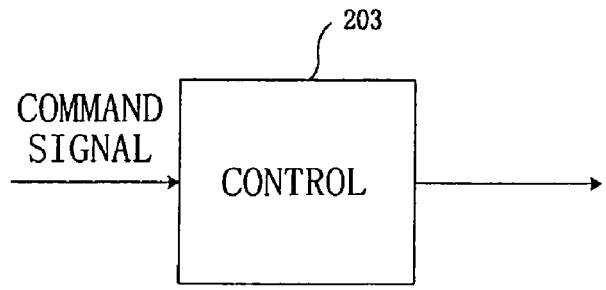

According to another embodiment of the present invention, as shown in FIG. 5, the controlling unit 203 can operate in accordance with an external indication signal (which indicates whether the x-branch codebook and the y-branch codebook converge to the same information source) in such a manner that, when the inputted indication signal indicates the two branches of signals converge to the same information source, the controlling unit 203 controls the switch 201 to switch upwards and then switch downwards again.

Specific method for generating the external indication signal can be found in Japanese patent Publication JP2007258157, which is herein incorporated by reference.

Figure 6:
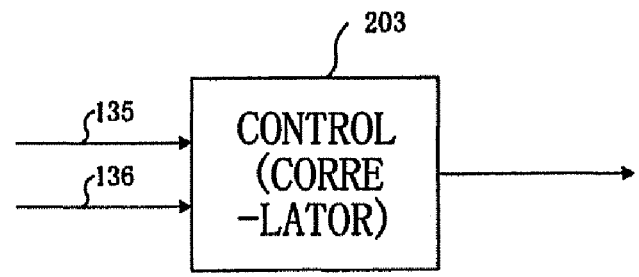

According to still another embodiment of the present invention, as shown in FIG. 6, the controlling unit 203 includes a correlation coefficient calculating unit for detecting whether the x-branch codebook and the y-branch codebook converge to the same information source. In the embodiment as shown in FIG. 6, input signals of the correlation coefficient calculating unit are the x-branch codebook 135 and the y-branch codebook 136 whose data have been recovered, and its correlation coefficient, $$c_0 = \frac{E\{a(n)b^*(n)\}}{\sqrt{E\{|a(n)|^2\}}\sqrt{E\{|b(n)|^2\}}}$$

(where a and b are respectively two branches of input signals, n is time domain index, function E( ) indicates averaging, a(n) indicates signal 135, and b(n) indicates signal 136), can be used to detect whether the two branches converge to the same information source. When the correlation coefficient (including the circumstance after time translation, for instance, time b translates in time to the left for i bit (where i is an integer greater than $-\lfloor n/2 \rfloor$ and less than $\lfloor n/2 \rfloor$)

$$c_{-i} = \frac{E\{a(n)b^*(n+i)\}}{\sqrt{E\{|a(n)|^2\}}\sqrt{E\{|b(n)|^2\}}}$$

or translates to the right for i bit $$c_i = \frac{E\{a(n)b^*(n-i)\}}{\sqrt{E\{|a(n)|^2\}}\sqrt{E\{|b(n)|^2\}}}$$

of the codebooks 135 and 136 is greater than a predetermined threshold, the controlling unit 203 controls the switch 201 to switch upwards and then switch downwards again.

If it is determined to have converged to the same information source, translation will be no more necessary. In addition, it needs only to calculate the translation of one branch.

Figure 7:
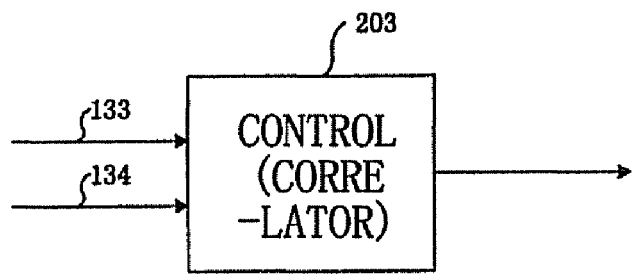

According to yet another embodiment of the present invention, as shown in FIG. 7, the controlling unit 203 includes a correlation coefficient calculating unit for detecting whether the x-branch codebook and the y-branch codebook converge to the same information source. In the embodiment as shown in FIG. 7, input signals of the correlation coefficient calculating unit are signals 133 and 134 whose phases have been recovered, and its correlation coefficient can be used to detect whether the two branches converge to the same information source. The calculation method of the correlation coefficient is the same as described above. When the correlation coefficient (including the circumstance after time translation) of the signals 133 and 134 is greater than a predetermined threshold, the controlling unit 203 controls the switch 201 to switch upwards and then switch downwards again.

Figure 8:
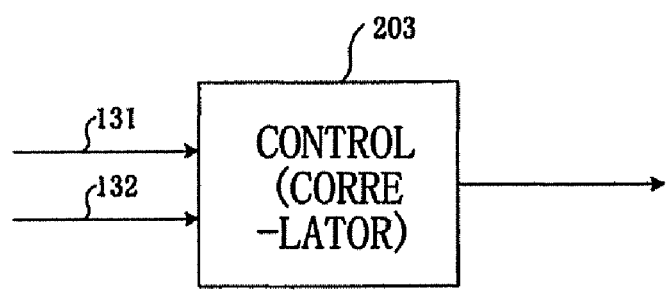

According to another embodiment of the present invention, as shown in FIG. 8, the controlling unit 203 includes a correlation coefficient calculating unit for detecting whether the x-branch codebook and the y-branch codebook converge to the same information source. In the embodiment as shown in FIG. 8, input signals of the correlation coefficient calculating unit are respectively equalized signals 131 and 132, and its correlation coefficient can be used to detect whether the two branches converge to the same information source. The calculation method of the correlation coefficient is the same as described above. When the correlation coefficient (including the circumstance after time translation) of the signals 131 and 132 is greater than a predetermined threshold, the controlling unit 203 controls the switch 201 to switch upwards and then switch downwards again.

Figure 9:
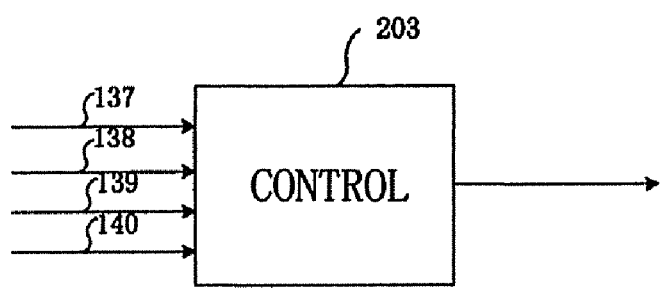

According to still another embodiment of the present invention, as shown in FIG. 9, the controlling unit 203 includes a correlation coefficient calculating unit for detecting whether the x-branch codebook and the y-branch codebook converge to the same information source. In the embodiment as shown in FIG. 9, input signals of the correlation coefficient calculating unit include the filter Hxx coefficient 137 and the filter Hyx coefficient 138, as well as the filter Hxy coefficient 139 and the filter Hyy coefficient 140.

The specific determining method includes frequency domain determining method and time domain determining method.

The frequency domain determining method is described below.

The detecting unit 203 inputs four sets of filter coefficients, which are respectively $$H_{xx}(1), H_{xx}(2) \ldots H_{xx}(n), H_{yx}(1), H_{yx}(2) \ldots H_{yx}(n),$$

$$H_{xy}(1), H_{xy}(2) \ldots H_{xy}(n), H_{yy}(1), H_{yy}(2) \ldots H_{yy}(n),$$

if $$1 - \varepsilon < \left| \frac{[H_{xx}(1) + H_{xx}(2) + \ldots H_{xx}(n)] \times [H_{yy}(1) + H_{yy}(2) + \ldots H_{yy}(n)]}{[H_{yx}(1) + H_{yx}(2) + \ldots H_{yx}(n)] \times [H_{xy}(1) + H_{xy}(2) + \ldots H_{xy}(n)]} \right| < 1 + \varepsilon,$$

the same information source is converged to, and the controlling unit 203 controls the switch 201 to switch upwards, and then switch downwards again (in the above Equation, ε is a small positive number, and $[H_{xx}(1)+H_{xx}(2)+\ldots H_{xx}(n)]$ indicates the summation of coefficients of the filter Hxx).

The above method is simply explained below:

When channels converge to the same information source, this corresponds to $$\begin{bmatrix} \tilde{H}_{xx}(\omega) & \tilde{H}_{yx}(\omega) \\ \tilde{H}_{xy}(\omega) & \tilde{H}_{yy}(\omega) \end{bmatrix} \begin{bmatrix} \tilde{C}_{xx}(\omega) & \tilde{C}_{yx}(\omega) \\ \tilde{C}_{xy}(\omega) & \tilde{C}_{yy}(\omega) \end{bmatrix} = \begin{bmatrix} Ae^{j\beta_1 + j\omega n_1 T} & 0 \\ Be^{j\beta_2 + j\omega n_2 T} & 0 \end{bmatrix}$$

or $$\begin{bmatrix} \tilde{H}_{xx}(\omega) & \tilde{H}_{yx}(\omega) \\ \tilde{H}_{xy}(\omega) & \tilde{H}_{yy}(\omega) \end{bmatrix} \begin{bmatrix} \tilde{C}_{xx}(\omega) & \tilde{C}_{yx}(\omega) \\ \tilde{C}_{xy}(\omega) & \tilde{C}_{yy}(\omega) \end{bmatrix} = \begin{bmatrix} 0 & Ae^{j\beta_1 + j\omega n_1 T} \\ 0 & Be^{j\beta_2 + j\omega n_2 T} \end{bmatrix},$$

where $\tilde{H}^{}(\omega)$ is frequency domain expression of filter transmission matrix, and $\tilde{C}^{}(\omega)$ is frequency domain expression of channel transmission matrix.

Regardless of whichever circumstances, the condition $[\tilde{H}_{xx}(0)\tilde{H}_{yx}(0)]=e^{j\phi}[\tilde{H}_{xy}(0)\tilde{H}_{yy}(0)]$ is satisfied, which is equivalent to $$\det\begin{bmatrix} \tilde{H}_{xx}(0) & \tilde{H}_{yx}(0) \\ \tilde{H}_{xy}(0) & \tilde{H}_{yy}(0) \end{bmatrix} = \tilde{H}_{xx}(0) * \tilde{H}_{yy}(0) - \tilde{H}_{yx}(0) * \tilde{H}_{xy}(0) = 0,$$

where $\tilde{H}_{xx}(0)$=the average value of coefficients of the filter Hxx, $\tilde{H}_{yx}(0)$=the average value of coefficients of the filter Hyx, $\tilde{H}_{xy}(0)$=the average value of coefficients of the filter Hxy, and $\tilde{H}_{yy}(0)$=the average value of coefficients of the filter Hyy.

The time domain determining method is described below.

As analyzed above, if channels converge to the same information source and are synchronous, the time domain coefficient of the filter also satisfies $$[H_{xx}(1) \, H_{xx}(2) \ldots H_{xx}(n) \, H_{yx}(1) \, H_{yx}(2) \ldots H_{yx}(n)] =$$

$$e^{j\phi}[H_{xy}(1) \, H_{xy}(2) \ldots H_{xx}(n) \, H_{yx}(1) \, H_{yx}(2) \ldots H_{yx}(n)],$$

where j is an imaginary number unit, and φ is a arbitrary angle, and correlation degree, $$c = \frac{H_{xx}(1)*H_{xy}^*(1) + \ldots H_{xx}(n)*H_{xy}^*(n) + H_{yx}(1)*H_{yy}^*(1) + \ldots H_{yx}(n)*H_{yy}^*(n)}{\sqrt{|H_{xx}(1)|^2 + \ldots |H_{xx}(n)|^2 + |H_{yx}(1)|^2 + \ldots |H_{yx}(n)|^2} \sqrt{|H_{xy}(1)|^2 + \ldots |H_{xy}(n)|^2 + |H_{yy}(1)|^2 + \ldots |H_{yy}(n)|^2}},$$

between $H_{xx}(1) H_{xx}(2) \ldots H_{xx}(n) H_{yx}(1) H_{yx}(2) \ldots H_{yx}(n)$ and $H_{xy}(1) H_{xy}(2) \ldots H_{xy}(n) H_{yy}(1) H_{yy}(2) \ldots H_{yy}(n)$ can be used to determine whether two branches converge to the same information source. For instance, it can be determined whether c satisfies the following Expression: if yes, it can be determined that the channels converge to the same information source:

$$1-\varepsilon < c < 1+\varepsilon.$$

At the same time, in order to prevent two branches from converging to different time delays of the same information source, it is also possible to calculate the correlation degree after translating the coefficient $[H_{xy}(1) \, H_{xy}(2) \ldots H_{xx}(n) \, H_{yx}(1) \, H_{yx}(2) \ldots H_{yx}(n)]$ to even number of bits, for instance, translating to the left for two bits $[H_{xy}(3), H_{xy}(4), \ldots H_{xy}(n), 0, 0, H_{yx}(3), H_{yx}(4), \ldots H_{yx}(n), 0\, 0]$. Zero filling is performed for insufficiency during the translation procedure. If it is determined to have converged to the same information source, the controlling unit 203 controls the switch 201 to switch upwards, and then switch downwards again.

As should be noted, although in the above explanations the filter coefficient switching unit 202, the controlling unit 203, and the switch unit 201 are integrated in the same unit together with the filter, the filter coefficient updating unit and the phase recovering unit that perform equalization operations, it is also possible to separately call the filter coefficient switching unit 202, the controlling unit 203, and the switch unit 201 as one unit or device, such as a filter coefficient changing device.

As should be additionally noted, although in the above explanations the filter coefficient switching unit is connected to the x-branch filter coefficient updating unit 129 and changes filter coefficients of the filters 119 and 120, it can also be connected to the y-branch filter coefficient updating unit 130 to change filter coefficients of the filters 117 and 118.

In addition, although the equalizer as illustrated in the present invention is of a disc-shaped structure, it can also be implemented in other structures, for instance, the phase recovering unit and the data recovering unit included therein can be respectively implemented in individual units.

It is possible to specifically implement the present invention in other modes without departing from the principle or basic features of the present invention. The embodiments as disclosed in the present application are exemplary, rather than restrictive, in all aspects. The scope of the present invention is indicated by the claims as attached rather than by the foregoing explanations, and all modifications that fall within equivalent connotation and scope of the claims are covered herein.

The invention claimed is:

1. A filter coefficient changing apparatus for use in a dual-polarized optical coherent receiver, wherein the dual-polarized optical coherent receiver comprising a front-end processing section and a data recovering unit; the front-end processing section performing front-end processing on an input signal including a first information source (h) and a second information source (v), and outputting a first component signal (115) and a second component signal (116); the data recovering unit recovering data and including a first receiving branch and a second receiving branch:

the first receiving branch including:
a first filtering unit (117), for filtering the first component signal to obtain a relevant component of the first information source;
a second filtering unit (118), for filtering the second component signal to obtain another relevant component of the first information source; and
a first filter coefficient updating unit (129), for updating a filter coefficient of the first filtering unit (117) and a filter coefficient of the second filtering unit (118);

the second receiving branch including:
a third filtering unit (119), for filtering the first component signal to obtain a relevant component of the second information source;
a fourth filtering unit (120), for filtering the second component signal to obtain another relevant component of the second information source; and
a second filter coefficient updating unit (130), for updating a filter coefficient of the third filtering unit (119) and a filter coefficient of the fourth filtering unit (120);

wherein the filter coefficient changing apparatus comprises a controlling unit (203), a switching unit (201) and a new coefficient obtaining unit (202), wherein the switching unit (201) is connected between the first filter coefficient updating unit (129) and the first filtering unit (117) and the second filtering unit (118), for transmitting the filter coefficients outputted by the first filter coefficient updating unit (129) to the first filtering unit (117) and the second filtering unit (118); or connected between the second filter coefficient updating unit (130) and the third filtering unit (119) and the fourth filtering unit (120), for transmitting the filter coefficients outputted by the second filter coefficient updating unit (130) to the third filtering unit (119) and the fourth filtering unit (120);

wherein, in the case the switching unit (201) is connected between the first filter coefficient updating unit (129) and the first filtering unit (117) and the second filtering unit (118), the new coefficient obtaining unit (202) generates new filter coefficients for the first filtering unit (117) and the second filtering unit (118) in accordance with the filter coefficients outputted by the second filter coefficient updating unit (130); and in the case the switching unit (201) is connected between the second filter coefficient updating unit (130) and the third filtering unit (119) and the fourth filtering unit (120), the new coefficient obtaining unit (202) generates new filter coefficients for the third filtering unit (119) and the fourth filtering unit (120) in accordance with the filter coefficients outputted by the first filter coefficient updating unit (129);

wherein the controlling unit (203) generates a control signal that controls switching of the switching unit;

and wherein the switching unit (201), in the case of its being used for transmitting the filter coefficients outputted by the first filter coefficient updating unit (129) to the first filtering unit (117) and the second filtering unit (118), upon reception of the control signal from the controlling unit and, breaks off the output of the filter coefficients from the first filter coefficient updating unit (129) to the first filtering unit (117) and the second filtering unit (118), transmits the new filter coefficients from the new coefficient obtaining unit (202) to the first filtering unit (117) and the second filtering unit (118), and subsequently resumes the output of the filter coefficients from the first filter coefficient updating unit (129) to the first filtering unit (117) and the second filtering unit (118); and in the case of its being used for transmitting the filter coefficients outputted by the second filter coefficient updating unit (130) to the third filtering unit (119) and the fourth filtering unit (120), upon reception of the control signal from the controlling unit and, breaks off the output of the filter coefficients from the second filter coefficient updating unit (130) to the third filtering unit (119) and the fourth filtering unit (120), transmits the new filter coefficients from the new coefficient obtaining unit (202) to the third filtering unit (119) and the fourth filtering unit (120), and subsequently resumes the output of the filter coefficients from the second filter coefficient updating unit (130) to the third filtering unit (119) and the fourth filtering unit (120).

2. The filter coefficient changing apparatus for use in a dual-polarized optical coherent receiver according to claim 1, characterized in that the controlling unit (203) counts the number of coefficient updates of the first filter coefficient updating unit or the number of coefficient updates of the second filter coefficient updating unit, and generates the control signal when the counted number is greater than a predetermined threshold.

3. The filter coefficient changing apparatus for use in a dual-polarized optical coherent receiver according to claim 1, characterized in that the controlling unit generates the control signal in accordance with a control instruction inputted from external to the controlling unit.

4. The filter coefficient changing apparatus for use in a dual-polarized optical coherent receiver according to claim 1, characterized in that the controlling unit generates the control signal in accordance with the filter coefficient of the first filtering unit (117), the filter coefficient of the second filtering unit (118), the filter coefficient of the third filtering unit (119) and the filter coefficient of the fourth filtering unit (120), and by judging whether the signal of the first receiving branch and the signal of the second receiving branch converge to the same information source.

5. The filter coefficient changing apparatus for use in a dual-polarized optical coherent receiver according to claim 1, characterized in that the first receiving branch further includes a first summating unit (121), and that the second receiving branch further includes a second summating unit (122), of which the first summating unit summates the output of the first filtering unit and the output of the second filtering unit, and the second summating unit summates the output of the third filtering unit and the output of the fourth filtering unit, wherein the controlling unit generates the control signal in accordance with the summation result of the first summating unit and the summation result of the second summating unit, and by judging whether the signal of the first receiving branch and the signal of the second receiving branch converge to the same information source.

6. The filter coefficient changing apparatus for use in a dual-polarized optical coherent receiver according to claim 1, characterized in that the first receiving branch further includes the first summating unit (121) and a first phase recovering unit (123), and that the second receiving branch further includes the second summating unit (122) and a second phase recovering unit (124), of which the first summating unit summates the output of the first filtering unit and the output of the second filtering unit, the second summating unit summates the output of the third filtering unit and the output of the fourth filtering unit, the first phase recovering unit recovers a phase of the signal from the first summating unit, and the second phase recovering unit recovers a phase of the signal from the second summating unit, wherein the controlling unit generates the control signal in accordance with the signal outputted by the first phase recovering unit and the signal outputted by the second phase recovering unit, and by judging whether the signal of the first receiving branch and the signal of the second receiving branch converge to the same information source.

7. The filter coefficient changing apparatus for use in a dual-polarized optical coherent receiver according to claim 1, characterized in that the first receiving branch further includes the first summating unit (121), the first phase recovering unit (123) and a first data recovering unit (125), and that the second receiving branch further includes the second summating unit (122), the second phase recovering unit (124) and a second data recovering unit (126), of which the first summating unit summates the output of the first filtering unit and the output of the second filtering unit, the second summating unit summates the output of the third filtering unit and the output of the fourth filtering unit, the first phase recovering unit recovers a phase of the signal from the first summating unit, the second phase recovering unit recovers a phase of the signal from the second summating unit, the first data recovering unit (125) recovers data in the signal from the first phase recovering unit, and the second data recovering unit (126) recovers data in the signal from the second phase recovering unit,
wherein the controlling unit generates the control signal in accordance with the signal outputted by the first data recovering unit and the signal outputted by the second data recovering unit, and by judging whether the signal of the first receiving branch and the signal of the second receiving branch converge to the same information source.

8. The filter coefficient changing apparatus for use in a dual-polarized optical coherent receiver according to claim 1, characterized in that the filter coefficient changing apparatus further comprises an on-off changing unit connected to the new coefficient obtaining unit (202), wherein, when the controlling unit sends the control signal, the on-off changing unit is turned on, so that the new coefficient obtaining unit (202) is capable of receiving the signal from the first filter coefficient updating unit or the second filter coefficient updating unit, and the on-off changing unit is subsequently turned off, so that the new coefficient obtaining unit (202) is incapable of receiving the signal from the first filter coefficient updating unit or the second filter coefficient updating unit.

9. The filter coefficient changing apparatus for use in a dual-polarized optical coherent receiver according to claim 1, characterized in that the new coefficient obtaining unit (202) includes an overturn center estimating unit, a symmetrically overturning unit and a complex conjugate substituting unit, of which the overturn center estimating unit, the symmetrically overturning unit and the complex conjugate substituting unit operate in accordance with one of the following modes:
Mode 1
the overturn center estimating unit determines the overturn center in accordance with an inputted filter coefficient;
the symmetrically overturning unit symmetrically overturns the inputted filter coefficient in accordance with the overturn center determined by the overturn center estimating unit;
the complex conjugate substituting unit performs complex conjugate substitution on the symmetrically overturned filter coefficient;
Mode 2
the overturn center estimating unit determines the overturn center in accordance with an inputted filter coefficient;
the complex conjugate substituting unit performs complex conjugate substitution on the inputted filter coefficient;
the symmetrically overturning unit symmetrically overturns, in accordance with the overturn center determined by the overturn center estimating unit, the filter coefficient on which the complex conjugate substitution has been performed;
Mode 3
the complex conjugate substituting unit performs complex conjugate substitution on an inputted filter coefficient;
the overturn center estimating unit determines the overturn center in accordance with the filter coefficient on which the complex conjugate substitution has been performed;
the symmetrically overturning unit symmetrically overturns, in accordance with the overturn center determined by the overturn center estimating unit, the filter coefficient on which the complex conjugate substitution has been performed.

10. A filter coefficient changing method for use in a dual-polarized optical coherent receiver, wherein the dual-polarized optical coherent receiver comprising a front-end processing section and an data recovering unit; the front-end processing section performing front-end processing on an input signal including a first information source (h) and a second information source (v), and outputting a first component signal and a second component signal; the data recovering unit recovering data and including a first receiving branch and a second receiving branch:
the first receiving branch including:
a first filtering unit (117), for filtering the first component signal to obtain a relevant component of the first information source;
a second filtering unit (118), for filtering the second component signal to obtain another relevant component of the first information source; and
a first filter coefficient updating unit (129), for updating a filter coefficient of the first filtering unit (117) and a filter coefficient of the second filtering unit (118);

the second receiving branch including:

a third filtering unit (119), for filtering the first component signal to obtain a relevant component of the second information source;

a fourth filtering unit (120), for filtering the second component signal to obtain another relevant component of the second information source; and a second filter coefficient updating unit (130), for updating a filter coefficient of the third filtering unit (119) and a filter coefficient of the fourth filtering unit (120);

wherein the filter coefficient changing method comprises:

a new coefficient obtaining step, for generating new filter coefficients for the first filtering unit (117) and the second filtering unit (118) in accordance with the filter coefficients outputted by the second filter coefficient updating unit (130), or generating new filter coefficients for the third filtering unit (119) and the fourth filtering unit (120) in accordance with the filter coefficients outputted by the first filter coefficient updating unit (129);

a control signal generating step, for generating a switching control signal; and a switching step, in the case the new coefficient obtaining step generating new filter coefficients for the first filtering unit (117) and the second filtering unit (118) in accordance with the filter coefficients outputted by the second filter coefficient updating unit (130), upon generation of the switching control signal in the control signal generating step, for inputting the new filter coefficients obtained in the new coefficient obtaining step into the first filtering unit (117) and the second filtering unit (118) to replace the filter coefficients outputted by the first filter coefficient updating unit (129), and subsequently inputting again the filter coefficients outputted by the first filter coefficient updating unit (129) into the first filtering unit (117) and the second filtering unit (118) to replace the new filter coefficients obtained in the new coefficient obtaining step; and, in the case the new coefficient obtaining step generating new filter coefficients for the third filtering unit (119) and the fourth filtering unit (120) in accordance with the filter coefficients outputted by the first filter coefficient updating unit (129), upon generation of the switching control signal in the control signal generating step, for inputting the new filter coefficients obtained in the new coefficient obtaining step into the third filtering unit (119) and the fourth filtering unit (120) to replace the filter coefficients outputted by the second filter coefficient updating unit (130), and subsequently inputting again the filter coefficients outputted by the second filter coefficient updating unit (130) into the third filtering unit (119) and the fourth filtering unit (120) to replace the new filter coefficients obtained in the new coefficient obtaining step.

\* \* \* \* \*